(12) United States Patent
Vache et al.

(10) Patent No.: US 9,157,395 B2
(45) Date of Patent: Oct. 13, 2015

(54) TWELVE-HOUR STRUCTURE FOR THRUST REVERSER, IN PARTICULAR WITH GRIDS

(75) Inventors: Jean-Bernard Vache, Le Havre (FR); Georges Laurent Valleroy, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 1164 days.

(21) Appl. No.: 12/863,477

(22) PCT Filed: Jan. 9, 2009

(86) PCT No.: PCT/FR2009/000023
§ 371 (c)(1),
(2), (4) Date: Sep. 12, 2011

(87) PCT Pub. No.: WO2009/106763
PCT Pub. Date: Sep. 3, 2009

(65) Prior Publication Data
US 2012/0097761 A1    Apr. 26, 2012

(30) Foreign Application Priority Data

Jan. 18, 2008    (FR) ...................................... 08 00264

(51) Int. Cl.
*F02K 1/72* (2006.01)
*B64D 29/06* (2006.01)
*B64C 7/02* (2006.01)

(52) U.S. Cl.
CPC . *F02K 1/72* (2013.01); *B64D 29/06* (2013.01); *B64C 7/02* (2013.01); *F05D 2220/36* (2013.01); *F05D 2300/612* (2013.01); *Y02T 50/672* (2013.01)

(58) Field of Classification Search
CPC .............. F02K 1/72; B64D 29/06; B64C 7/02
USPC .................. 60/796, 226.1, 226.2, 226.3, 230; 244/54, 110 B
See application file for complete search history.

(56) References Cited

U.S. PATENT DOCUMENTS

| | | | |
|---|---|---|---|
| 5,083,426 A | 1/1992 | Layland | |
| 6,584,763 B2 * | 7/2003 | Lymons et al. | ............... 60/226.2 |
| 6,824,101 B2 * | 11/2004 | Sternberger et al. | ......... 60/226.2 |
| 2007/0294996 A1 * | 12/2007 | Stephan et al. | ............... 60/226.2 |
| 2010/0062238 A1 * | 3/2010 | Doyle et al. | ............... 428/295.1 |

FOREIGN PATENT DOCUMENTS

| | | |
|---|---|---|
| EP | 1456659 A2 | 9/2004 |
| WO | 2007147193 A1 | 6/2007 |

OTHER PUBLICATIONS

International Search Report PCT/FR2009/000023; Dated Sep. 22, 2009.

* cited by examiner

*Primary Examiner* — William H Rodriguez
*Assistant Examiner* — Carlos A Rivera
(74) *Attorney, Agent, or Firm* — Brinks Gilson & Lione

(57) ABSTRACT

The invention relates to a twelve-hour structure for a thrust reverser, that comprises a half beam (1) capable of holding a reverser half cowling and including a plurality of hinge yokes (9c) for rotatingly mounting said half beam (1) on a nacelle-holding mast. The half beam (1) is at least partially made of a composite material.

8 Claims, 4 Drawing Sheets

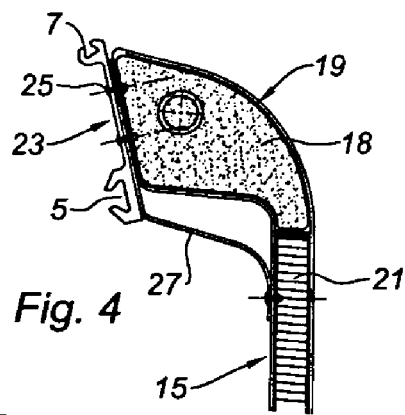
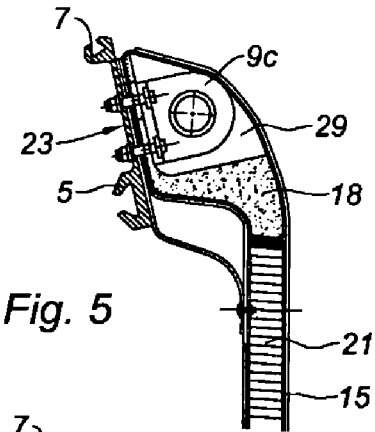
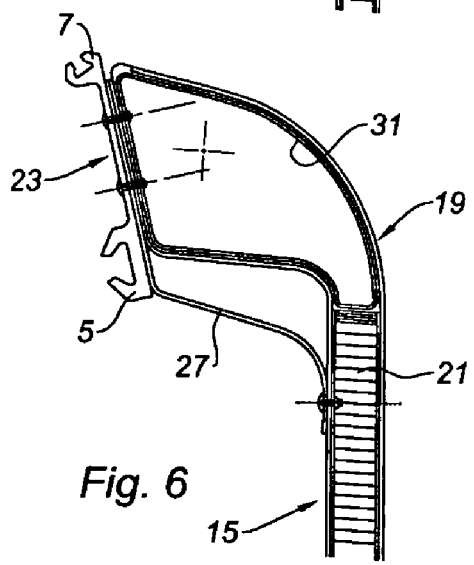
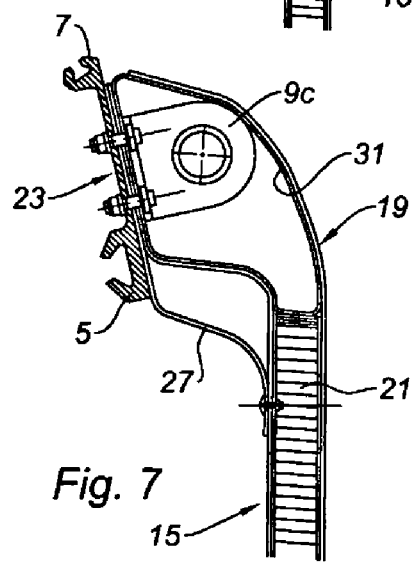
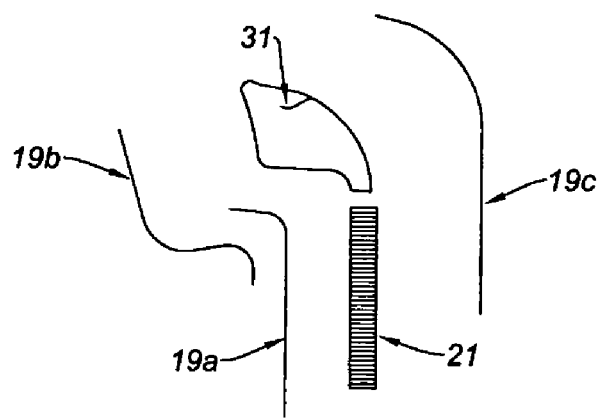

TWELVE-HOUR STRUCTURE FOR THRUST REVERSER, IN PARTICULAR WITH GRIDS

TECHNICAL FIELD

The present invention concerns a twelve-hour structure for thrust reverser, in particular with grids.

BACKGROUND

Traditionally, a thrust reverser with grids comprises two half-cowlings mounted each sliding on a half-beam mounted pivoting on a nacelle-holding mast.

The sliding movement of each half-cowling on its associated half-beam makes it possible to make the thrust reverser go from a direct jet configuration to a reverse jet configuration, and vice versa.

The rotational movement of each half-beam on the nacelle-holding mast makes it possible to make each half-cowling pivot relative to said mast for maintenance operations.

As illustrated in the appended FIGS. 1 and 2, each half-beam 1 is formed in a ribbed metal alloy 3, and typically comprises, on its outer face, primary 5 and secondary 7 rails capable of allowing the movement of the associated half-cowling (not shown), and a plurality of hinge yokes 9a, 9b, 9c, 9d capable of allowing the articulation of the half-beam 1 on the associated nacelle mast.

A receptacle 11, mounted on the upstream part (relative to the direction of air flow in the nacelle) of the half-beam 1, allows the fixing of a front frame designed to support the grids of the thrust reverser (frame and grids not shown).

As visible in FIG. 3, the half-beam 1 is attached by riveting 13 on the upper part 15 of an internal fixed half-structure panel 17, generally made of a composite material, and defining, with the associated thrust reverser cowling, the cold air jet.

The assembly formed by the half-beam 1, its rails 5, 7 and its hinge yokes 9a to 9d is often referred to as "twelve-hour structure", given its position at the top of the circle defined by a nacelle section, and by analogy with the dial of a watch.

BRIEF SUMMARY

The present invention aims in particular to provide a twelve-hour structure lightened relative to those of the prior art.

This aim of the invention is achieved with a twelve-hour structure for thrust reverser, comprising a half-beam capable of supporting a reverser half-cowling and including a plurality of hinges for the rotational mounting of said half-beam on a nacelle-holding mast, remarkable in that said half-beam is formed at least in part in composite material.

The use of composite material to manufacture this half-beam makes it possible to considerably lighten its weight.

According to other optional features of the present invention:

said half-beam also comprises at least one rail for slidingly mounting said half-cowling: such a rail is adapted to the case of a thrust reverser with grids;

said half-beam is integrated into the upper part of an internal fixed half-structure panel: in this first embodiment, it is no longer necessary to rivet the half-beam on the internal fixed half-structure panel (this internal structure frequently being designated by "IFS", i.e. Internal Fixed Structure), which makes it possible to save assembly/disassembly time;

said half-beam comprises a foam core enveloped in the skin of said panel: this variation, in which the foam can be a closed cell foam such as a ROHACELL 110 WF type, for example, makes it possible to obtain the desired rigidity for the half-beam while having a low weight;

said half-beam comprises a case in composite material enveloped in the skin of said panel: this variation, in which the case can for example be in an epoxy matrix such as a HEXPLY 914 type, makes it possible to save weight relative to the foam filling of the preceding variation;

said hinge yokes are formed in a metal alloy;

said half-beam comprises a core including one part in foam and a tube in composite material, this core being enveloped in the skin of said panel: this variation makes it possible to save weight relative to the first of the above-mentioned variations, while using a standard composite tube, i.e. not specially formed for this particular use;

said tube is formed in forged carbon: this material offers an excellent resistance/weight compromise;

said rails and said hinge yokes sandwich said skin: this arrangement allows good resistance both of the rails and the hinge yokes;

said half-beam is attached on the upper part of an internal fixed half-structure panel: this second embodiment can be adapted to a traditional internal fixed half-structure without requiring any modification of the latter;

said half-beam comprises a closed case in composite material whereof one of the faces is formed by a plate supporting said at least one rail: such a half-beam can be manufactured by simple assembly of a small number of pieces;

said half-beam comprises an open case in composite material integrating said at least one rail: this variation can be obtained by molding, for example of the "RTM" (Resin Transfer Molding) type, such molding making it possible to obtain a single-unit piece;

said at least one rail is connected to said open case on a single face thereof: this variation can be obtained by drape molding of a single half-mold, the rails being placed in the other half-mold;

said at least one rail is held between two layers of said open case: this variation, making it possible to obtain rails connected more closely to the rest of the case, requires the drape molding of two half-molds;

said hinge yokes are formed in forged carbon: these yokes, which offer excellent resistance with a low weight, can be placed in the molds for the open case variations.

The present invention also relates to a nacelle for aircraft engine, remarkable in that it comprises a twelve-hour structure according to the preceding.

BRIEF DESCRIPTION OF THE DRAWINGS

Other features and advantages of the present invention will appear in light of the following description, and upon examining the appended figures, in which:

FIGS. 4 and 5 are transverse cross-sectional views of a first embodiment of a twelve-hour structure according to the invention, in running section and in the zone where one of the hinge yokes is found, respectively;

FIGS. 6 and 7 are views similar to FIGS. 4 and 5 of a variation of the first embodiment according to the invention;

FIG. 8 diagrammatically indicates all of the components making it possible to realize a twelve-hour structure according to FIGS. 6 and 7;

Figure 1:
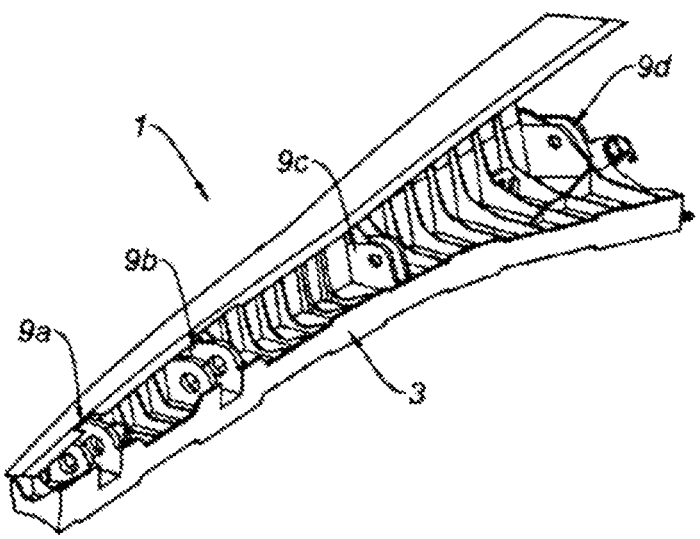
FIGS. 1 and 2 are perspective views of a twelve-hour structure of the prior art, mentioned in the preamble of the present description.
Figure 2:
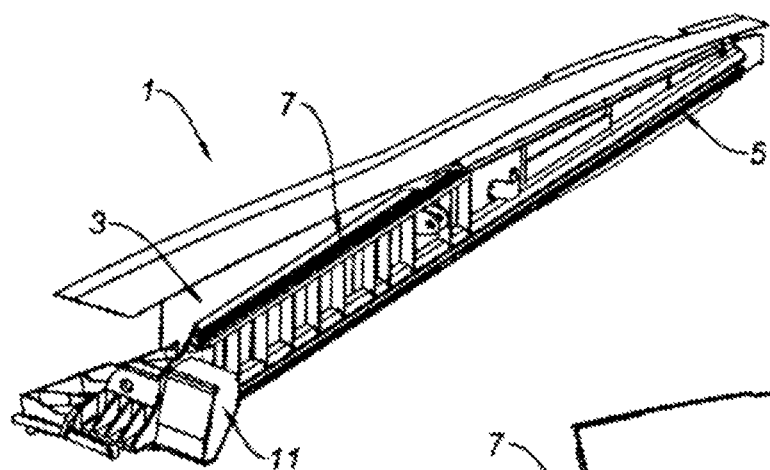
Figure 3:
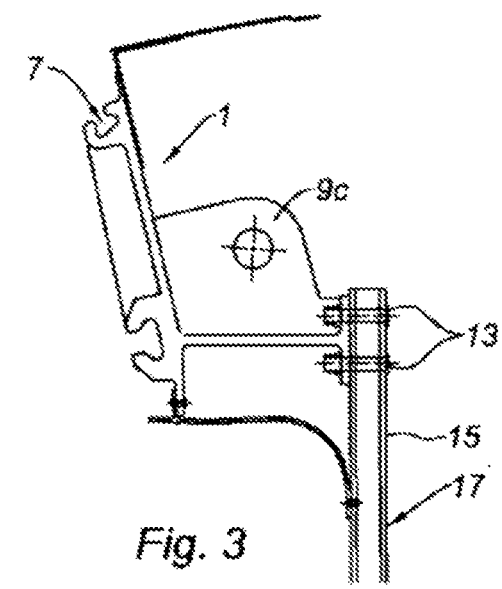
FIG. 3 is a transverse view of said twelve-hour structure, taken at one of the hinge yokes of said structure.

In all of these figures, identical or similar references designate identical or similar members or sets of members.

DETAILED DESCRIPTION

In reference now to FIGS. 4 and 5, one can see that, according to a first embodiment of the twelve-hour structure of the invention, the half-beam 1 is integrated into the upper part 15 of an internal fixed half-structure panel 17.

More specifically, in the variation illustrated in FIGS. 4 and 5, the half-beam 1 comprises a foam core 18 enveloped in the skin 19 situated on either side of the honeycomb structure 21 of the panel 15.

The foam 18, which can for example be a ROHACELL 110 WF foam, the skin 19 and the honeycomb structure 21 are made in a single co-curing operation.

A plate 23 integrating the primary 5 and secondary 7 rails, formed for example in a metal alloy, is fixed by riveting 25 on the skin 19.

Preferably, between this plate 23 and this skin 19 is a profile 27 defining an aerodynamic shape suitable for the flow of cold air along the panel 15.

As visible in FIG. 5, in the zones of the hinges 9a to 9d, the skin 19 is interrupted and the foam 18 comprises housings 29 in which the hinge yokes are arranged (9c in FIG. 5).

These hinge yokes are bolted on the plate 23, thus sandwiching on one hand the aerodynamic profile 27, and on the other hand the skin 19.

In the alternative illustrated in FIGS. 6 and 7, the foam core 18 is replaced by a monolithic case 31, formed in composite material.

This case is preferably pre-cured, the skin 19 then being overmolded on this case.

FIG. 8 shows that the alternative illustrated in FIGS. 6 and 7 is formed by the assembly of a plurality of simple elements: skin parts 19a, 19b, 19c, honeycomb structure 21 and monolithic case 31.

The assembly of all of these simple elements is done by complete co-curing.

The fixing of the plate 23 and the yokes 9a to 9d is similar to that of the preceding alternative.

It is understood that, due to the hollow nature of the monolithic case 31, this alternative allows a significant weight savings relative to the preceding alternative.

Figure 9:
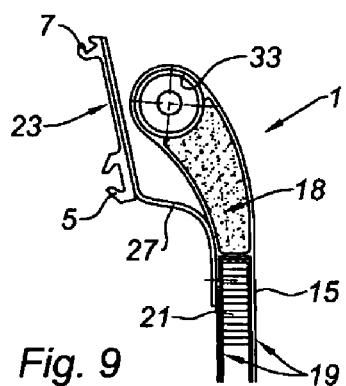
FIGS. 9 and 10 are views similar to FIGS. 4 and 5 of another variation of the first embodiment according to the invention.
Figure 10:
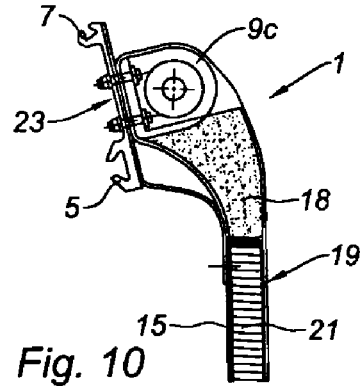
Figure 11:
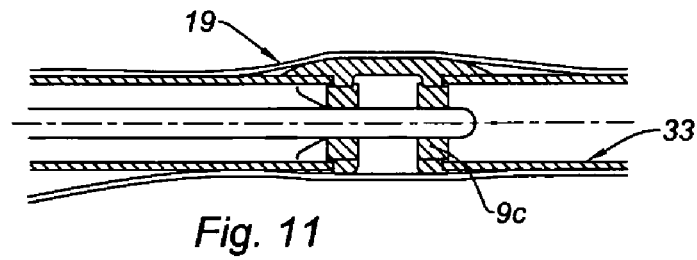
FIG. 11 is an axial cross-sectional view of the tube forming the twelve-hour structure of FIGS. 9 and 10, in the zone of one of the hinge yokes of said structure.

In the variation illustrated in FIGS. 9 to 11, the skin 19 surrounds a tube 33 in composite material, connecting the hinge yokes 9a to 9d to each other.

This tube and these yokes can be realized for example in forged carbon, making it possible to obtain an excellent resistance/weight compromise.

In the zone between the honeycomb structure 21 and the tube 33 is a foam core 18 similar to that of the alternative of FIGS. 4 and 5.

The plate 23 supporting rails 5 and 7 is connected to the panel 15 via the profile 27.

In the zones where the hinge yokes 9a to 9d are found, this plate 23 is also bolted on these yokes, as is visible in FIG. 10.

This alternative is interesting because it allows the use of forged carbon tubes 33 of standard dimension around which one tapes the skin 19: one is thus freed from the need to design a custom piece, which makes it possible to reduce the manufacturing cost.

Figure 12:
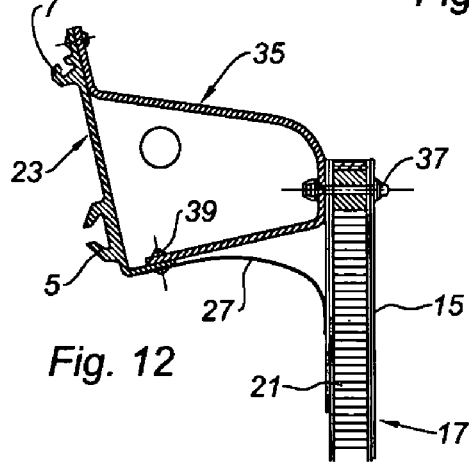
FIGS. 12 and 13 are views similar to FIGS. 4 and 5 of a second embodiment according to the invention.
Figure 13:
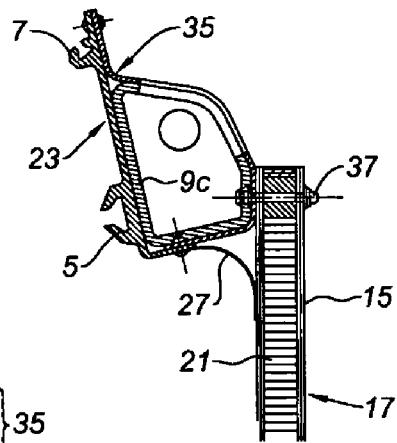
Figure 14:
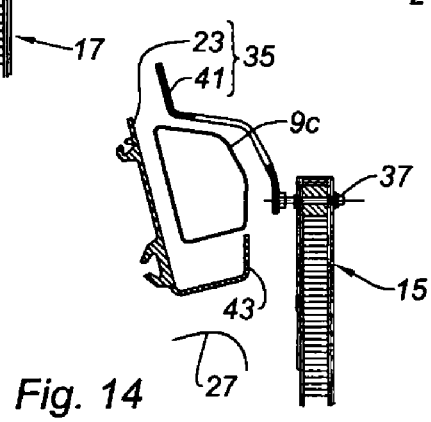
FIG. 14 is a view similar to FIG. 8 of said second embodiment.

We will now look at FIGS. 12 to 14, in which we have shown a second embodiment of the twelve-hour structure according to the invention.

In the embodiment illustrated in these three figures, this twelve-hour structure comprises a closed case 35 made in composite material, one of the faces of this case being defined by the plate 23 supporting the primary 5 and secondary 7 rails.

This plate can be formed in a metal alloy, or in "extruded" composite.

Contrary to the preceding embodiment, the case 35 is attached by bolting 37 on the upper part 15 of the internal fixed half-structure panel 17.

As visible in FIGS. 12 and 13, the profile 27 of aerodynamic form connecting the case 35 to the panel 15 can be held by the rivets 39 connecting the plate 23 to the rest of the case 35.

FIG. 13 shows that the hinge yokes 9a to 9d, which can for example be formed in forged carbon, are placed inside the case 35, and fixed to the panel 15 by rivets 37.

FIG. 14 shows that this alternative can be formed by the assembly of simple elements: plate 23, case half-shell 41, hinge yokes 9a to 9d and fastening bolts 37.

This FIG. 14 also shows that the plate 23 can advantageously comprise a return 43 designed to be held by the bolts 37, thereby avoiding having to use rivets 39.

Contrary to the previous embodiment, it is understood that this embodiment can be attached on a standard internal fixed half-structure 17, thus not requiring any modification of the upper panel 15 of said structure.

Figure 15:
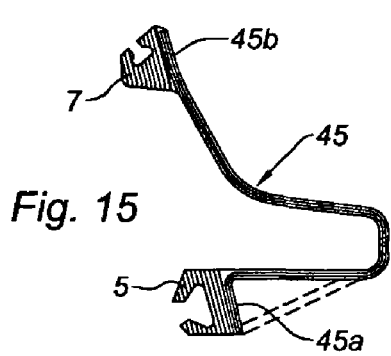
FIGS. 15 and 16 are views similar to FIGS. 4 and 5 of a variation of this second embodiment.
Figure 16:
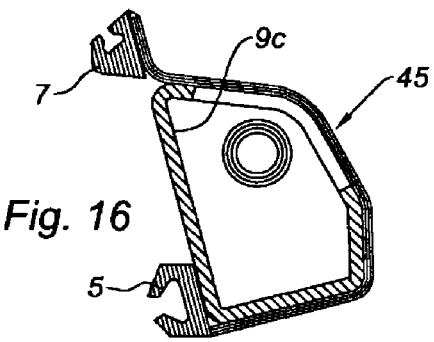
Figure 17:
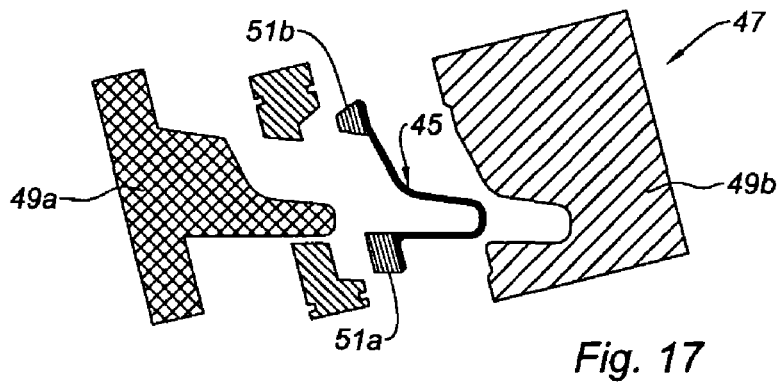
FIG. 17 diagrammatically indicates the manner in which the variation of FIGS. 15 and 16 can be obtained by molding.

In the alternative of this second embodiment illustrated in FIGS. 15 to 17, the half-beam 1 of the twelve-hour structure according to the invention comprises an open case 45 formed by the drape molding of several layers of a composite material.

At the free ends 45a, 45b of said open case 45 are the rails 5 and 7, also preferably formed by drape molding of several successive layers of composite material.

Inside the open case 45 are the hinge yokes 9a to 9d, as illustrated in FIG. 16.

As visible in FIG. 17, the twelve-hour structure illustrated in FIGS. 15 and 16 can be realized by molding in a mold 47 comprising a core 49a and a matrix 49b.

The preforms 51a, 51b defining the rails 5 and 7 are placed on the core 49a and the composite material layers forming the case will be draped on these preforms 51a, 51b, and on the core 49a.

One then closes the matrix 49b on the core 49a, and injects resin into the interface between said matrix and said core, thus making it possible to assemble the various elements forming the half-beam 1 (this molding method is traditionally known as "RTM", or "Resin Transfer Molding").

Figure 18:
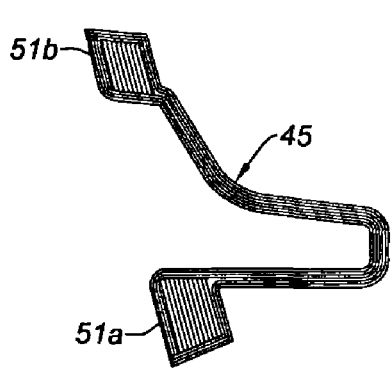
FIG. 18 is a view similar to FIG. 4 of a third variation of the second embodiment according to the invention.
Figure 19:
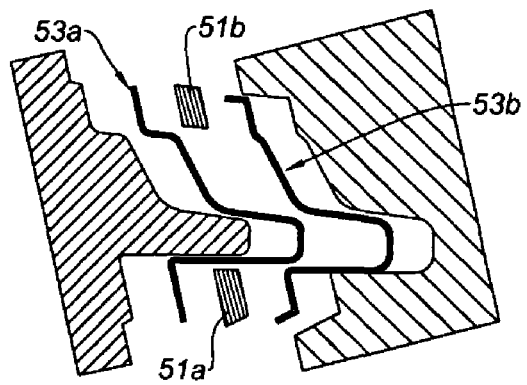
FIG. 19 is a view similar to FIG. 17 of the molding operation of the structure of FIG. 18.

In the alternative illustrated in FIGS. 18 and 19, one sees that one can advantageously form the open case 45 from two drape molding sub-assemblies 53a, 53b, clamping the rail preforms 51a, 51b.

This particular arrangement, which can also be obtained using a RTM-type method, allows a close connection of the rails 5, 7 with the open case 45, and therefore excellent resistance of the assembly.

As one can understand in light of the preceding, the two embodiments of the invention and their associated alternatives make it possible to obtain a twelve-hour structure half-beam whereof at least one part is realized in composite material, thereby allowing an important weight savings relative to the twelve-hour structures of the prior art.

Of course, the present invention is in no way limited to the embodiments described and illustrated, provided as simple examples.

The invention claimed is:

1. An aircraft nacelle comprising:
    at least one internal fixed half-structure panel defining, with an associated thrust reverser cowl, a cold air flow; and
    a twelve-hour structure for thrust reverser comprising a half-beam capable of supporting a reverser half-cowling,
    wherein said half-beam comprises a plurality of hinge yokes for rotational assembly of said half-beam on a nacelle-holding mast, and said half-beam is formed at least in part in composite material,
    wherein said half-beam and an upper part of the at least one internal fixed half-structure panel form, without mechanical connection, a single unitary part, and wherein the single unitary part is formed by surrounding a foam core or a composite material case of said half-beam with a skin of said at least one internal fixed half-structure panel.

2. The nacelle according to claim 1, wherein said half-beam also comprises at least one rail for sliding assembly of said half-cowling.

3. The nacelle according to claim 1, wherein said hinge yokes are formed in a metal alloy.

4. An aircraft nacelle including at least one internal fixed half-structure panel and a twelve-hour structure for thrust reverser, comprising a half-beam capable of supporting a reverser half-cowling and including a plurality of hinge yokes for rotational assembly of said half-beam on a nacelle-holding mast, said half-beam is formed at least in part in composite material,
    wherein said half-beam and an upper part of the at least one internal fixed half-structure panel form a single unitary part, and
    wherein said half-beam comprises a core including a foam part and a tube in composite material, the core being surrounded in a skin of the at least one internal fixed half-structure panel, and the tube connecting the hinge yokes to each other.

5. The nacelle according to claim 4, wherein said tube is formed in forged carbon.

6. An aircraft nacelle including at least one internal fixed half-structure panel and a twelve-hour structure for thrust reverser, comprising a half-beam capable of supporting a reverser half-cowling and including a plurality of hinge yokes for rotational assembly of said half-beam on a nacelle-holding mast, said half-beam is formed at least in part in composite material,
    wherein said half-beam and an upper part of the at least one internal fixed half-structure panel form a single unitary part, and said half-beam also comprises at least one rail for sliding assembly of the reverser half-cowling and a foam core surrounded in a skin of the at least one internal fixed half-structure panel, and wherein said hinge yokes sandwich said skin.

7. The nacelle according to claim 6, wherein said hinge yokes are formed in forged carbon.

8. The nacelle according to claim 5, wherein said hinge yokes are formed in forged carbon.

* * * * *